United States Patent

[11] 3,590,280

[72] Inventors James R. Hudson
Perryville;
John C. Spann, Baltimore, both of, Md.

[21] Appl. No. 877,651
[22] Filed Nov. 18, 1969
[45] Patented June 29, 1971
[73] Assignee Westinghouse Electric Corporation
Pittsburgh, Pa.

[54] VARIABLE MULTIPHASE CLOCK SYSTEM
10 Claims, 3 Drawing Figs.

[52] U.S. Cl. .......... 307/269, 307/208, 307/273, 307/279, 307/291, 328/62, 328/63, 328/207
[51] Int. Cl. .......... H03k 5/00, H03k 17/00
[50] Field of Search .......... 307/208, 260, 269, 273, 279, 289, 291; 328/59, 60, 62, 63, 71, 72, 74, 195, 196, 201, 206, 207

[56] References Cited
UNITED STATES PATENTS

| | | | |
|---|---|---|---|
| 3,067,343 | 12/1962 | Roscoe .......... | 307/269 X |
| 3,317,843 | 5/1967 | Emmons .......... | 307/273 X |

*Primary Examiner*—Stanley D. Miller, Jr.
*Attorneys*—F. H. Henson and E. P. Klipfel ABSTRACT: A multiphase clock system operated from a master clock oscillator which is capable of providing a plurality of clock signals having remotely controllable variable pulsewidths as well as mutually variable phase shifts utilizing J-K flip-flop integrated circuit components of the emitter coupled current mode logic type in combination with field effect transistors of the MOSFET type which are operated as voltage controlled variable resistances and suitable timing capacitors for transforming integrated circuit J-K flip-flops into monostable multivibrators.

The invention herein described was made in the course of contract with the Department of the Army under contract No. DAAB-03-67-A-0010.

VARIABLE MULTIPHASE CLOCK SYSTEM

CROSS-REFERENCE TO RELATED APPLICATION

The subject invention is related in concept to a patent application filed concurrently herewith entitled "Voltage Variable Clock Oscillator," U.S. Ser. No. 877,650 filed Nov. 18, 1969, in the name of James R. Hudson and John C. Spann. This application is also assigned to the assignee of the present invention.

BACKGROUND OF THE INVENTION

1. Field of the Invention

This invention relates to digital multiphase clock systems wherein a plurality of synchronized clock signals are required. Furthermore, the invention is directed to remotely controlled variable clock systems utilizing integrated circuits which are fabricated on monolithic semiconductor substrates for providing reliable low-cost densely packed apparatus. Additionally, the subject invention relates to electronic circuitry utilizing semiconductor devices known as MOSFET transistors.

2. Description of the Prior Art

Emitter coupled current mode logic circuits are generally well known to those skilled in the art having been described in the publication entitled *The Integrated Circuit Data Book*, published by Motorola Semiconductor Products, Inc., 1968, at pages 10–5, inclusive. Additionally, pages 10—16 and 10—17 disclose a line driver circuit and a J–K flip-flop circuit incorporating the teachings of emitter coupled current mode logic circuits the type identified as the MECL family of monolithic integrated circuits. These circuits utilize transistors operative in the nonsaturating mode wherein a typical voltage swing between a logic "0" and "1" is in the order of 0.75 volts. The J–K flip-flop is additionally disclosed in U.S. Pat. No. 3,444,395 issued to P.B. Foster, et al. This family of integrated circuits provides a wide variety of basic modules from which a desired logic configuration can be constructed therefrom.

The use of field effect devices as voltage variable resistors is also known to those skilled in the art. For example, U.S. Pat. No. 3,134,912 issued to A.D. Evans, discloses such a teaching. Additionally, U.S. Pat. No. 3,441,748 issued to R.E. Werner, discloses a bidirectional insulated gate field effect transistor (IGFET) with symmetrical linear resistance with specific substrate voltage control.

Finally, a four-phase clock system operated from a pair of clock signals and utilizing field effect devices is disclosed in U.S. Pat. No. 3,448,295, issued to F.M. Wanlass.

While the above referenced prior art operates in a desired manner, it does not disclose a variable clock system wherein both the pulsewidth and the time phase of a plurality of clock output signals is variable.

SUMMARY

The present invention comprises an improved clock system wherein a plurality of clock output signals are provided the pulsewidth and time phase of which is variable in accordance with a plurality of control voltages applied thereto from a remote location and wherein each phase signal of the plurality of output signals comprises a first and a second one-shot mutivibrator including a RC time constant including a field effect transistor operated as a voltage variable resistance and controlled by separate control voltages such that the time constant of the second one-shot multivibrator resets after the first one-shot multivibrator, and a flip-flop circuit coupled to said first and said second one-shot multivibrator being responsive to the output thereof for being triggered into a first state by the output of said first one-shot multivibrator and to its opposite state by the output of said second one-shot multivibrator.

DESCRIPTION OF THE PREFERRED EMBODIMENT

Figure 1:
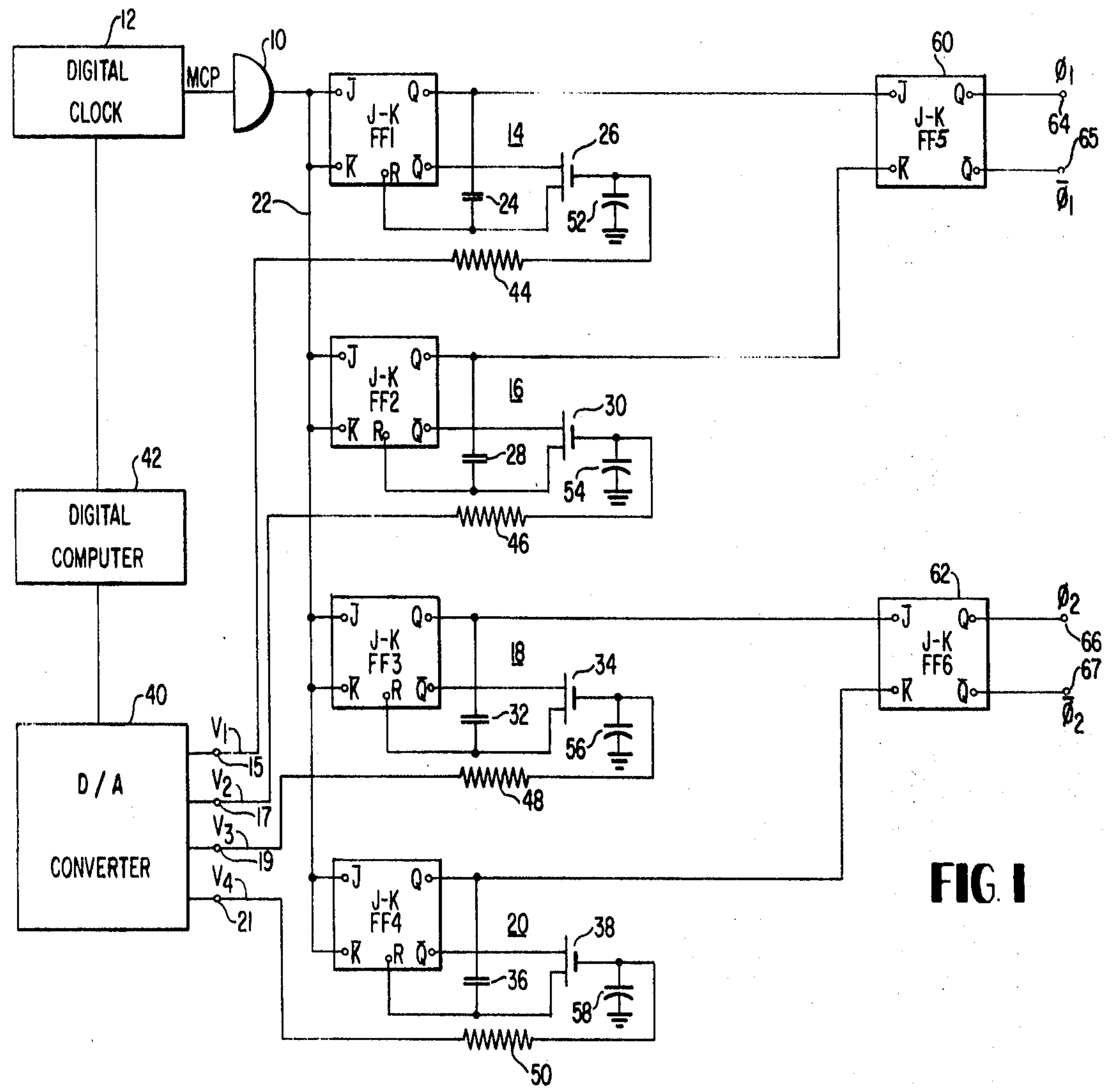
FIG. 1 is an electrical schematic diagram partly in block diagrammatic form of a two-phase system comprising the preferred embodiment of the subject invention.

Referring now to the drawings wherein FIG. 1 is illustrative of the preferred embodiment of the subject invention, there is disclosed two phases of a multiphase clock output clock system having a master clock pulse signal MCP applied to a pulse shaper circuit 10 from a master clock oscillator 12. The MCP signal comprises a series of digital pulses occurring at predetermined regular intervals of a predetermined fixed frequency. The pulse shaper circuit 10 receives the MCP clock signal from the clock oscillator 12 and suitably shapes the leading and trailing edges of the waveform as well as providing additional drive capability by way of a low output impedance. Such a circuit may comprise a MECL driver circuit including a differential amplifier utilized as the input stage coupled to an emitter follower circuit. Such a circuit is well known to those skilled in the art, an example of which is disclosed at pages 10—17 of the *Integrated Circuit Data Book*, referenced above wherein the input is applied to one of the plurality of inputs to a differential amplifier and the output is obtained from one of two emitter follower circuits coupled to the differential amplifier. The MCP output from the pulse shaper 10 comprises an input signal which is simultaneously fed to a plurality of one-shot multivibrators 14, 16, 18 and 20. Each of these one-shot multivibrators are identical with respect to one another, and are comprised of J–K integrated flip-flop circuits FF1, FF2, FF3, and FF4 which are converted to one-shot multivibrator signal generators by the coupling of a resistance-capacitance charging and discharging feedback circuit between the Q and $\overline{Q}$ output terminals. More specifically, both the $\overline{J}$ and $\overline{K}$ input terminals of FF1...FF4 are commonly coupled to the input signal from the pulse shaper circuit 10 by means of a circuit lead 22. The Q and $\overline{Q}$ output terminals of FF1 are connected to a series combination of a capacitor 24 and a field effect transistor 26 with the common connection therebetween coupled to the R (RESET) terminal. The field effect transistor 26 is connected to the $\overline{Q}$ terminal while the capacitor 24 is connected to the Q terminal. The field effect transistor is preferably of the type referred to as a MOSFET (metal oxide silicon field effect transistor) and the drain-source resistance comprises the resistive portion of the RC network.

The J–K integrated flip-flop circuit is a well-known storage device and is described in detail in *Logical Design of Digital Computers*, by Montgomery Phister, Jr., John Wyley and Sons, Incorporated, 1963. As noted above it is also disclosed in U.S. Pat. No. 3,444,395. The device normally includes one or more J input terminals and one or more K input terminals that provide an AND input function at the "J and K" terminals. By this is meant that the flip-flop will have a determinate state when two identical binary switching signals at voltage levels sufficient to change the state of the flip-flop are simultaneously applied to the J and K inputs. The two output terminals designated Q and $\overline{Q}$ indicate the state of the device and its inverse, respectively. The flip-flop is said to be in the "set" state or condition when the Q output is at a binary logic "1" level and the $\overline{Q}$ is at the "O" level. When the Q and $\overline{Q}$ terminals are at a "O" and "1" level respectively, the flip-flop is said to be in the "reset" state. When a voltage of proper polarity and magnitude is applied to the R terminal, the flip-flop will switch to the "reset" state.

Accordingly, each of the J–K flip-flops, FF1, FF2, FF3, and FF4 respectively include the timing capacitors 24, 28, 32, and 36 as well as respective MOSFET devices 26, 30, 34, 38 to form the monostable multivibrators 14, 16, 18, and 20. Each of the gate electrodes of the MOSFET devices 26, 30, 34, 38 are coupled to a separate control voltage $V_1$, $V_2$, $V_3$ and $V_4$ applied to terminals 15, 17, 19, and 21, respectively, from a suitable control source 40 which may be, for example, a digital to analog converter coupled to a digital computer 42 operating under the influence of the master clock oscillator 10. Each of the voltages $V_1$, $V_2$, $V_3$ and $V_4$ applied to the respective gate electrodes is adapted to control the drain-source resistance of the MOSFET 26, 30, 34, 38, respectively. Additionally, the series resistance 44, 46, 48 and 50 in combination with the capacitors 52, 54, 56 and 58 comprise RC filter circuits which may be deleted when desirable.

Additionally, an output flip-flop circuit 60 comprised of J–K flip-flop FF5 is utilized in combination with the one-shot multivibrator signal generators 14 and 16 and has its $\bar{J}$ input terminal connected to the Q output terminal of FF1 while the $\bar{K}$ input terminal is connected to the Q output terminal of FF2. In a like manner, a second output flip-flop circuit 62 is coupled to the one-shot multivibrator signal generators 18 and 20 by having its $\bar{J}$ input terminal connected to the Q output terminal of FF3 and its $\bar{K}$ input terminal connected to the Q output terminal FF4. A first phase output signal $\theta_1$ appears at the Q terminal of the first output flip-flop 60 which is coupled to output terminal 64. The second output flip-flop 62 has its output appearing at the Q output terminal which is common to output terminal 66 and comprises the second phase output signal $\theta_2$.

Figure 2:
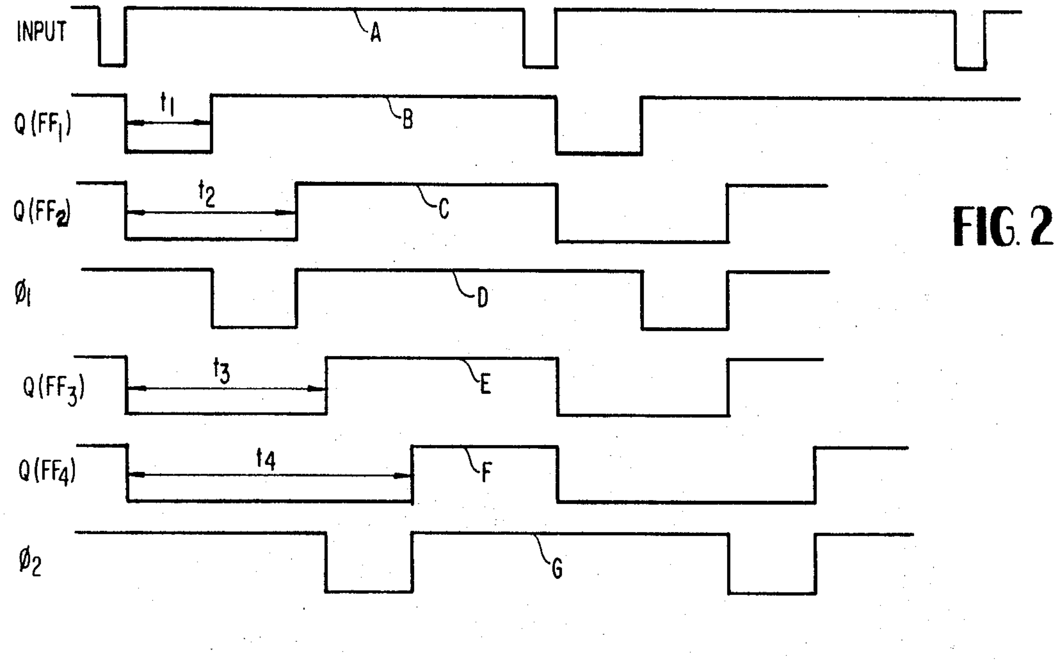
FIG. 2 is a timing diagram of waveforms illustrative of the operation of the embodiment shown in FIG. 1.

The operation of the embodiment shown in FIG. 1 will be discussed considering the waveforms of the timing diagram shown in FIG. 2. Waveform A of FIG. 2 is illustrative of the input signal appearing on circuit lead 22. On the positive going edge of the first pulse of waveform A, the outputs of the one-shot generators 14–16–18 and 20 will be "set" to the low output state as shown by waveforms B, C, E and F. The phase outputs $\theta_1$ and $\theta_2$ which comprise the output signal of the flip-flops 60 and 62 are shown by waveforms D and G, respectively. At the time that the one-shot multivibrator signal generators 14, 16, 18 and 20 are "set" to their low output states, the signals $\theta_1$ and $\theta_2$ do not change. The triggering of the one-shot multivibrators causes the respective capacitors 24, 28, 32 and 36 to change its voltage charge in accordance with the change of voltage at the terminals Q and $\bar{Q}$ which may be, for example, between −0.7 volts and −1.55 volts. The Q outputs of the four one-shot signal generators 14, 16, 18 and 20 moreover will remain in the low state for a period of time determined by the RC time constants of the feedback capacitor and the drain-to-source resistance of the respective MOSFET transistor. When the voltage appearing at the respective R terminal reaches for example −1.15 volts, the one-shot multivibrator will switch or change state. When the first one-shot signal generator 14 switches from the low state to the high state, i.e., "set," the output flip-flop 60 and the voltage at the Q terminal thereof switches to its low state and will remain in the low state until the output of the second one-shot multivibrator 16 switches from its low state to its high state. The drain-source resistance of the MOSFET 26, 30, 34, and 38 is selectively adjusted by the respective control voltages $V_1$, $V_2$, $V_3$ and $V_4$ and as a consequence, the RC time constants of the one-shot signal generator 14, 16, 18 and 20, such that the first one-shot signal generator 14 "resets" first, then followed by the second one-shot signal generator 16 and then the third and fourth one-shot signal generator 18 and 20, sequentially. The resulting output phase signals as indicated by waveforms D and G, will be synchronously provided at terminals 64 and 66. Moreover, the timed relationship between $\theta_1$ and $\theta_2$ waveforms D and G can be varied not only in pulse width, but also in timed phase relationship by adjusting the gate-to-source voltage of the respective MOSFET 26, 30, 34, 38 by means of the voltages $V_1$, $V_2$, $V_3$ and $V_4$, respectively which may be applied from a remote source and may be selectively programmable from the digital computer 42.

Figure 3:
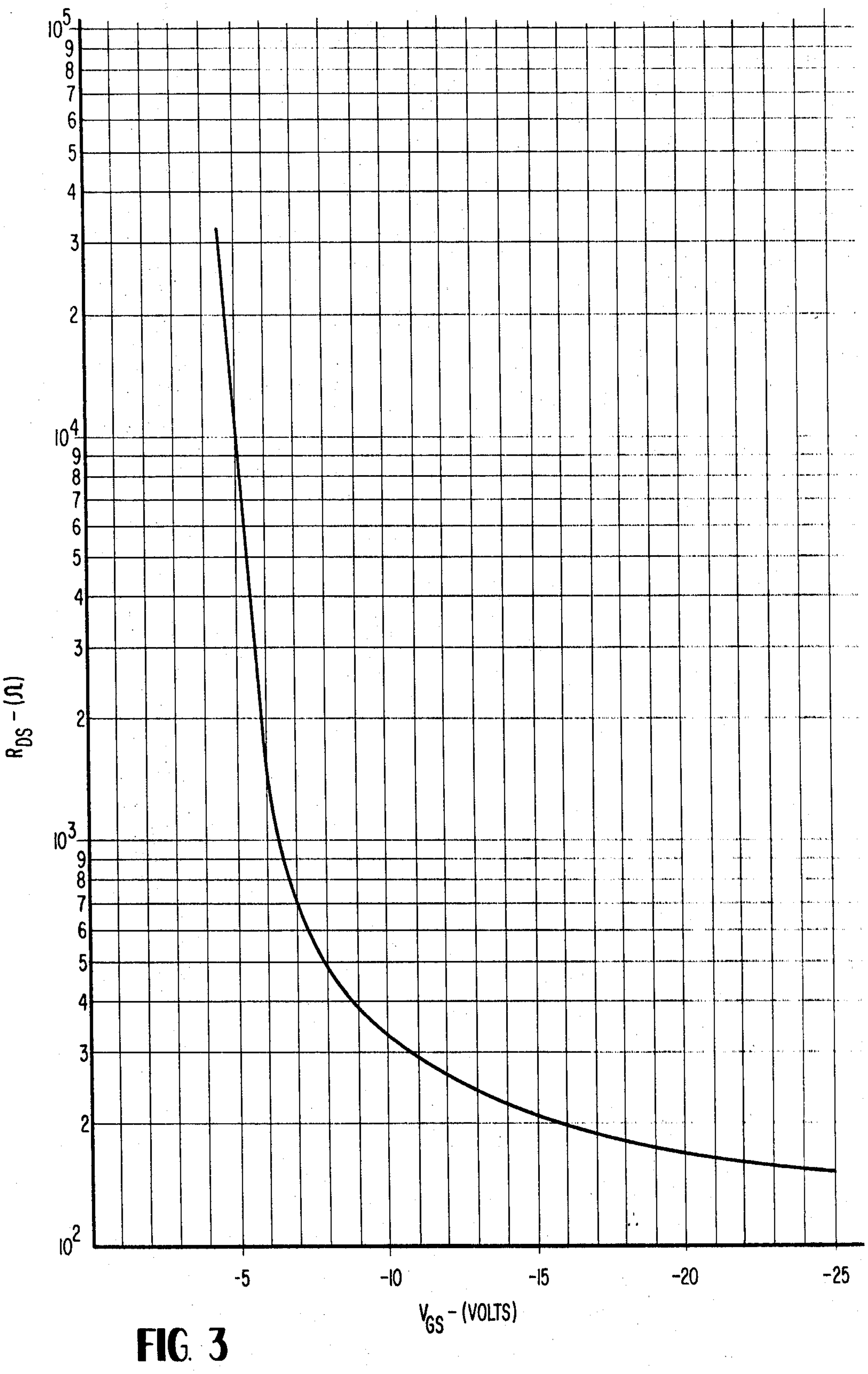
FIG. 3 is a graphical illustration of the drain-source resistance vs. control voltage characteristic of a field effect transistor utilized in the above embodiment shown in FIG. 1.

The drain-to-source resistance of the MOSFET devices decreases nonlinearly as the gate-to-source voltage increases. This characteristic is shown by reference to FIG. 3, which illustrates the relationship of the drain-source resistance as a function of the voltage applied between the gate and source junctions. Due to the high input impedance of the MOSFET device, the driving source, i.e., the digital to analog converter 40, can be remotely located from the respective one-shot multivibrator signal generator stages with the R C filtering being provided for example, by the resistor 44 and the capacitor 52 of the first stage.

Where the one-shot multivibrator signal generators 14—20 are typically comprised of Motorola Semiconductor MC364J–K flip-flops and the MOSFET devices are comprised of MEM 511 transistors, an approximation of the "on" time of each one-shot multivibrator stage can be expressed as:

$$t_{on}=20 \text{ nanoseconds}+1.4_{ds}(C+ah5 \text{ picofarads})$$

where $R_{ds}$ is the drain-source resistance in ohms and $C$ is the respective timing capacitor value expressed in farads.

What has been shown and described, therefore, is a remotely controllable variable clock generator system which utilizes a MOSFET device in combination with integrated circuit J–K flip-flops. This combination is particularly useful for emitter coupled current mode logic gates because the voltage swing of the output is small (−0.75 volts to −1.55 volts) so that the drain-source resistance of the FET device is not effected thereby.

While the present invention has been described with a certain degree of particularity, it should be observed that the specification has been disclosed by way of example only, and is not meant to be interpreted in a limiting sense.

We claim as our invention:

1. A voltage variable clock system operable in response to a master clock signal from a clock oscillator for providing a clock signal output which is variable both in pulse width and phase in accordance with at least one control voltage applied thereto from a remote source, comprising in combination;

at least a first and a second one-shot multivibrator digital logic circuit each comprised of a multivibrator circuit having at least one input terminal, a pair of complementary output terminals providing mutually opposite binary logic state signals thereat indicative of a logic "0" state and a logic "1" state, and a reset terminal; and a resistance-capacitance feedback network having a common connection therebetween, for controlling a period of operation of each said multivibrator circuit between a "set" and a "reset" state coupled across said pair of output terminals of each multivibrator circuit and including means coupling said common connection to said reset terminal;

said resistance-capacitance feedback network furthermore comprising a capacitance and a voltage variable resistance coupled to said remote source and varied in accordance with a control voltage applied therefrom;

said control voltage applied to the variable resistance coupled to said second multivibrator being of a magnitude for effecting a period of operation of said second one-shot multivibrator which is greater than said first one-shot multivibrator;

circuit means commonly coupling said master clock signal simultaneously to said at least one input terminal of both said first and second multivibrator circuits;

a flip-flop circuit having a first and a second input terminal and at least one output terminal;

circuit means coupling one output terminal of said first one-shot multivibrator to said first input terminal of said flip-flop circuit; and circuit means coupling the corresponding one output terminal of said second one-shot multivibrator to said second input terminal of said flip-flop circuit, being alternately triggered by signals from said first and second one-shot multivibrator thereby to produce a first phase clock signal at said at least one output terminal.

2. The invention as defined by claim 1 wherein said multivibrator circuit of said first and second one shot multivibrator is comprised of a J–K flip-flop circuit including $\overline{J}$ and $\overline{K}$ input terminals, Q and $\overline{Q}$ output terminals and a reset terminal and wherein said resistance-capacitance feedback network coupled across said pair of output terminals is coupled across said Q and $\overline{Q}$ terminals and said common connection therebetween is coupled to said reset terminal.

3. The invention as defined by claim 2 wherein said voltage variable resistance comprises a field effect device having an input electrode and a pair of output electrodes and wherein said pair of output electrodes are coupled between said Q or $\overline{Q}$ terminal and said common connection.

4. The invention as defined by claim 3 wherein said capacitance comprises a fixed capacitor.

5. The invention as defined by claim 3 wherein said field effect device comprises a field effect transistor and wherein said input electrode comprises a gate and said pair of output electrodes comprises the source and drain electrodes, respectively.

6. The invention as defined by claim 5 wherein said field effect transistor comprises a metal oxide silicon field effect transistor.

7. The invention as defined by claim 6 and additionally including a resistance-capacitance filter circuit coupled between said remote source and said gate electrode.

8. The invention as defined by claim 1 and additionally including a filter circuit coupled between said remote source and said voltage variable resistance.

9. The invention as defined by claim 1 wherein said flip-flop circuit comprises a J–K flip-flop circuit including $\overline{J}$ and $\overline{K}$ input terminals Q and $\overline{Q}$ output terminals and wherein said first input terminal comprises the $\overline{J}$ input terminal and the second input terminal comprises the $\overline{K}$ input terminal and wherein said at least one output terminal comprises the Q terminal.

10. The invention as defined by claim 1 wherein said multivibrator circuit of said first and second one-shot multivibrator and said flip-flop circuit are comprised of J–K flip-flop circuits and said voltage variable resistance comprises the drain-source resistance of a MOS field effect transistor.